(12) United States Patent
Kornhaas et al.

(10) Patent No.: US 6,223,132 B1
(45) Date of Patent: *Apr. 24, 2001

(54) CIRCUIT ARRANGEMENT HAVING A SENSOR AND AN EVALUATION CIRCUIT

(75) Inventors: Hermann Kornhaas; Axel Marzluf, both of Villingen-Schwenningen (DE)

(73) Assignee: Deutsch Thomson-Brandt GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,971

(22) Filed: Apr. 23, 1998

(30) Foreign Application Priority Data

Apr. 29, 1997 (DE) .............................. 197 17 933

(51) Int. Cl.⁷ .................................................... G08C 15/00
(52) U.S. Cl. .............................. 702/79; 324/160; 702/145
(58) Field of Search .................... 702/79, 145, 147, 702/148; 324/160; 73/488

(56) References Cited

U.S. PATENT DOCUMENTS

| | | | |
|---|---|---|---|
| 4,885,710 | * | 12/1989 | Hersberger et al. .............. 364/565 |
| 4,916,643 | | 4/1990 | Ziegler et al. . |
| 5,019,773 | * | 5/1991 | Sugiura et al. ..................... 324/166 |
| 5,267,544 | * | 12/1993 | Ohkumo et al. ................... 123/414 |
| 5,487,009 | * | 1/1996 | Hill .................................... 364/449 |
| 5,493,290 | * | 2/1996 | Kern ............................. 340/870.37 |
| 5,705,748 | * | 1/1998 | Moench ............................... 73/462 |
| 5,767,394 | * | 6/1998 | Butts et al. .......................... 73/116 |

FOREIGN PATENT DOCUMENTS

| | | | |
|---|---|---|---|
| 3106269A1 | 2/1981 | (DE) | ............... H04B/9/00 |
| 3106269 A1 | 10/1982 | (DE) | ............... H04B/9/00 |
| 3150313 C2 | 8/1983 | (DE) | ............... H04Q/9/14 |
| 3225081 A1 | 1/1984 | (DE) | ............... G08C/15/00 |
| 3225081A1 | 1/1984 | (DE) | ............... G08B/26/00 |
| 3150313C2 | 3/1985 | (DE) | ............... H04Q/9/14 |
| 3701082 C2 | 7/1988 | (DE) | ............... G01K/1/02 |
| 3843062 A1 | 6/1990 | (DE) | ............... G08C/15/06 |
| 3843062A1 | 6/1990 | (DE) | ............... G08C/15/06 |
| 4003582 A1 | 8/1991 | (DE) | ............... G08C/15/00 |
| 4003582A1 | 8/1991 | (DE) | ............... G08C/15/00 |
| 4029556 A1 | 3/1992 | (DE) | ............... H04J/9/00 |
| 4029556A1 | 3/1992 | (DE) | ............... H04J/9/00 |
| 4210189 C2 | 10/1993 | (DE) | ............... G08C/19/24 |
| 4210189C2 | 10/1993 | (DE) | ............... G08C/19/24 |
| 4232995 A1 | 4/1994 | (DE) | ............... H04L/5/02 |
| 4232995A1 | 4/1994 | (DE) | ............... H04L/5/02 |
| 4321292 | 1/1995 | (DE) | ............... H04L/25/00 |
| 4321292 A1 | 1/1995 | (DE) | ............... H04L/25/00 |
| 19600570A1 | 7/1996 | (DE) | ............... H04L/5/00 |

* cited by examiner

Primary Examiner—Patrick Assouad
(74) Attorney, Agent, or Firm—Joseph S. Tripoli; Robert D. Shedd; David T. Shoneman

(57) ABSTRACT

The circuit arrangement comprises at least two movable elements (1 to 3) which are to be monitored and which are assigned a sensor (4 to 6) in each case. The output signals of the sensors (4 to 6) are fed to an evaluation circuit (7) via a common connection. The evaluation circuit (7) has only a single input for receiving the signals of the sensors (4 to 6). Each sensor (4 to 6) emits a pulse shape characterizing the connected element. The pulse shapes of the pulses generated by the sensors are configured in such a way that the evaluation circuit can uniquely identify the individual pulses, even in the case of superimposition.

2 Claims, 1 Drawing Sheet

US 6,223,132 B1

CIRCUIT ARRANGEMENT HAVING A SENSOR AND AN EVALUATION CIRCUIT

BACKGROUND OF THE INVENTION

1. Field of the Invention

The invention relates to a circuit arrangement having a sensor and an evaluation circuit.

2. Description of the Background Art

It is known when monitoring more than one moving element to assign said elements sensors and to feed the output signals to evaluation circuits which respectively process said output signals. In the case of integrated evaluation circuits, at least one input is required for this purpose per sensor in the case of the evaluation circuit. The sensors can be simply constructed in the case of this previously known solution. However, each sensor requires a dedicated evaluation circuit.

A further previously known solution comprises a bus system. The sensors are connected to an evaluation circuit by means of a bus. The data of the sensors are fed via the bus to the evaluation circuit using a multiplex method. In this solution, the sensors are relatively complex and thus correspondingly expensive.

SUMMARY OF THE INVENTION

The invention is based on the object of specifying a circuit arrangement, having sensors and an evaluation circuit, which uses simply constructed sensors to reduce the outlay on circuitry for an evaluation circuit. dedicated sensor is respectively assigned to said elements-and generates pulses which are characteristic of the element to be monitored. Said pulses are then fed to an evaluation circuit via a common line.

It is advantageous in this case to be able to use simple sensors such as optical elements, Hall elements, mechanical pulse generators or the like.

The signals of the sensors need not be fed to the evaluation circuit via a line using the multiplex method, but can be transmitted, superimposed on one another, on the same line.

It is advantageous to use only one evaluation circuit, which can separate and evaluate the incoming signals. Owing to the uniqueness of the signals, they can be assigned to the connected sensors and, depending on the construction of the evaluation circuit, can be processed sequentially or in parallel.

A microcomputer can advantageously be used for this purpose. The evaluation can then be carried out in a very cost effective fashion by means of a program.

In one embodiment of the invention, the data to be measured are transmitted by periodic repetition of the pulses characterizing the sensors.

The evaluation circuit therefore has no difficulty in monitoring the state of the elements to be monitored, since the latter can be identified uniquely by their pulse shape.

This characterization is preferably achieved by determining each pulse by means of individual pulse width and individual pulse spacing within a pulse period. The result of this is that a unique determination of the origin of the pulses is performed even in the case of superimposition of the pulses of various sensors.

BRIEF DESCRIPTION OF THE DRAWINGS

An exemplary embodiment of the invention is described with the aid of the drawings, in which.

DETAILED DESCRIPTION OF THE PREFERRED EMBODIMENT

Figure 1:
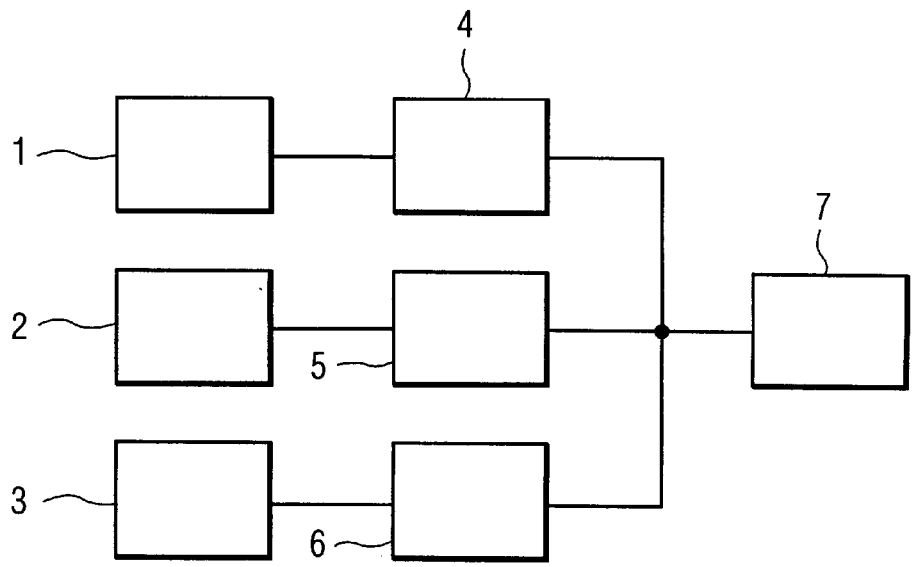
FIG. 1 shows a circuit arrangement according to the invention.

FIG. 1 shows a circuit arrangement according to the invention having three elements 1 to 3 to be monitored, their respectively assigned sensors 4 to 6 and an evaluation circuit 7. The outputs of the sensors 4 to 6 are connected to the evaluation circuit 7 via a common line.

The invention is not limited to three elements. It is also possible for only two or more than three elements to be monitored using sensors and an evaluation circuit.

FIG. 2 shows a signal shape of the pulses as they are generated by the sensors 4 to 6.

Figure 2A:
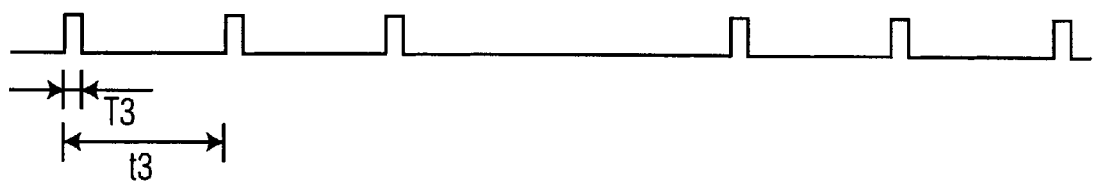
FIG. 2 shows a signal shape.

In FIG. 2a, a pulse, which is repeated periodically, consists of three individual pulses of constant width and constant spacing.

Figure 2B:

In FIG. 2b, a pulse, which is repeated periodically, consists of two individual pulses of constant width and constant spacing.

Figure 2C:
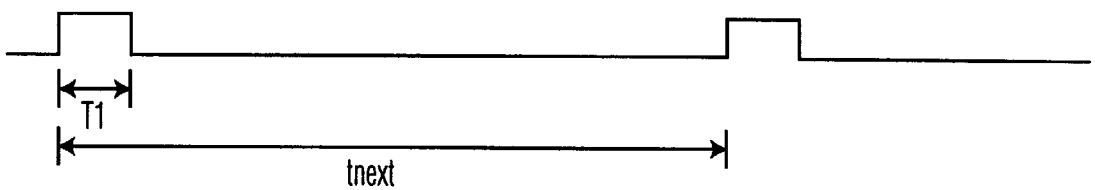

In FIG. 2c, a pulse, which is repeated periodically, consists of only one individual pulse.

The pulses are constructed as follows for the purpose of unique identification of the elements:

All the pulses have the same pulse frequency.

The pulses are composed of individual pulses.

The pulse width is assigned as follows to the individual sensors 4 to 6:

In the case of, for example, n=3 sensors, n input signals are assigned to a signal S[n] n pulses having an arbitrary individual pulse width $T_n$. This pulse shape is assigned to the third sensor 4. The next sensor 5 has an individual pulse width $T_{n-1} > T_n$, and the sensor 6 then has an individual pulse width $T_{n-2} > T_n + T_{n-1}$.

An individual pulse width of $$T_{n-x} > \sum_{n-x+1}^{n} T_v$$

is thus valid in general, where n=number of sensors present, and x=number of the sensor.

The individual pulse spacing is yielded as follows according to the invention:

There is no value for $t_{n-x}$ where n−x=1, because there is only one pulse.

For $t_2$, it holds that $t_2 > T_1$, where $T_1$=individual pulse width of the n−xth=first sensor 6.

It then holds for $t_3$ that $t_3 > T_2 + t_2$, where $T_2$=individual pulse width and $t_2$=individual pulse spacing of the second sensor 5.

With the exception of a single individual pulse in a period, an individual pulse spacing of:

$$t_n > T_{n-1} + t_{n-1}$$

is thus valid in general.

The pulse frequency is yielded as:

$$T_{next} > t_n * (n-1) + T_n$$

n being equal to the maximum number of the sensors.

Each sensor output signal can be uniquely identified, even in the case of superimposition, by this setting of the pulse shape, according to the invention, of the individual sensors.

What is claimed is:

1. Circuit arrangement having an evaluation circuit, at least two sensors and at least two elements, each element corresponding to a respective one of said at least two sensors, wherein the elements are movably configured, in that, in the case in which the elements move, the sensors assigned to the moving sensors emit pulses, the sensors being constructed to generate a pulse shape characterizing the sensors or elements and the outputs of the sensors are connected to a common input of the evaluation circuit, wherein said sensors generate pulse shapes characterizing the sensors by individual pulse width and individual pulse spacing and, in the case of n elements, the sensors assigned to the elements generate pulses consisting of individual pulses having a pulse width $$T_{n-x} > \sum_{n-x+1}^{n} T_v$$

where n>x and v=current sensor, having an individual pulse spacing $t_n > T_{n-1} + t_{n-1}$ and a limitation, equal for the sensors, with respect to the time $t_{next}$ from which repetition of the pulses of the sensors is permitted, where $t_{next} > t_n*(n-1) + T_N$.

2. Circuit arrangement according to claim 1, characterized in that the sensors (4 to 6) are constructed in such a way that the pulses are periodically repeated in the case of continuous movement of the elements (1 to 3).

* * * * *